United States Patent

[11] 3,588,286

| [72] | Inventor | Robert T. J. Skinner<br>Kenilworth, England |
|---|---|---|
| [21] | Appl. No. | 835,055 |
| [22] | Filed | June 20, 1969 |
| [45] | Patented | June 28, 1971 |
| [73] | Assignee | Joseph Lucas (Industries) Limited<br>Birmingham, England |

[54] CONTROL SYSTEMS FOR HYDRAULIC PUMPS
3 Claims, 3 Drawing Figs.

[52] U.S. Cl. .................................................... 417/218,
91/49, 91/506
[51] Int. Cl. .................................................... F04b 49/00,
F15b 13/102
[50] Field of Search .......................................... 103/162,
162 (A); 91/49, 505, 506; 417/221, 222, 271, 218

[56] References Cited
UNITED STATES PATENTS

| 2,714,288 | 8/1955 | Davis | 103/5 |
| 2,743,582 | 5/1956 | Wiedmann | 103/161V |
| 2,848,954 | 8/1958 | Budzich | 103/173 |
| 3,407,738 | 10/1968 | Bosch | 103/38 |

Primary Examiner—Carlton R. Croyle
Assistant Examiner—John J. Vrablik
Attorney—Holman & Stern ABSTRACT: A control system for an hydraulic positive displacement-type pump comprising a piston in a cylinder, the piston being connected to the swashplate of the pump, a spool in a bore in the piston and passage means whereby fluid can reach opposite ends of the piston to cause it to move to control the inclination of the pump swashplate, the position of the spool controlling the flow through the passages, and a spring acting between the piston and the spool and means including system of rollers and slots for varying the force exerted by the spring upon the spool in accordance with the position of the piston in the cylinder.

INVENTOR
Robert Thomas John Skinner
BY Holman, Glascock,
Downing & Seebold
ATTORNEYS

CONTROL SYSTEMS FOR HYDRAULIC PUMPS

This invention relates to hydraulic positive displacement-type pumps having a control system whereby capacity or displacement of the pump can be varied, said control system including a piston and cylinder unit to which fluid can be supplied under pressure from the pump.

The object of the invention is to provide a control system of the kind referred to in a convenient from whereby characteristic variation of the displacement with changing running conditions can be obtained.

According to the present invention a control system for an hydraulic positive displacement-type pump comprises a piston and cylinder unit, movement of the piston controlling the displacement of the pump, a spool disposed within the piston, passage means in the piston controlled by the spool whereby fluid at high pressure from the pump can reach opposite ends of the cylinder respectively and a spring acting between the spool and the piston or a part carried thereby, and means for varying the force exerted by the spring upon the spool in accordance with the position of the piston in the cylinder.

Figure 1:
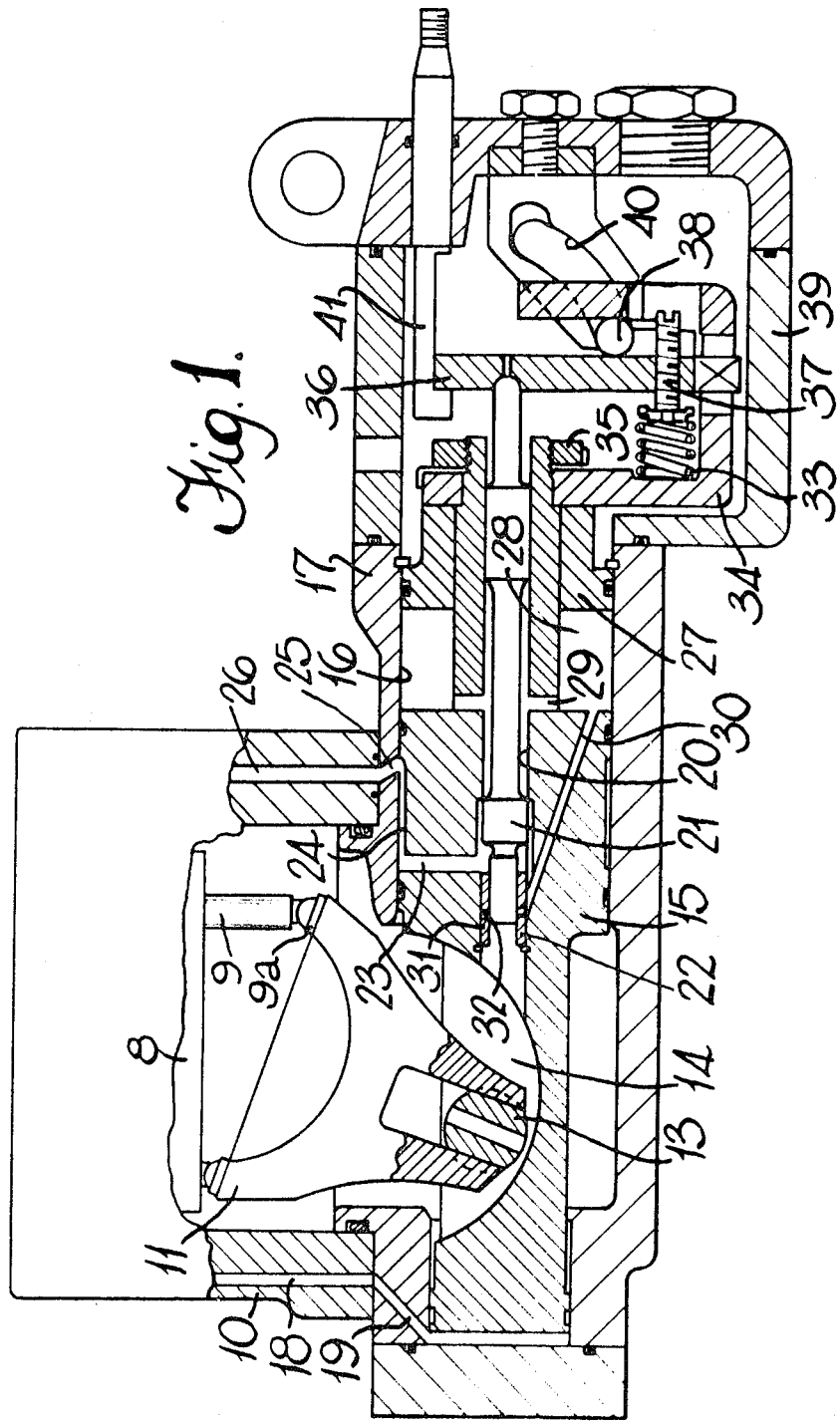
Figure 2:
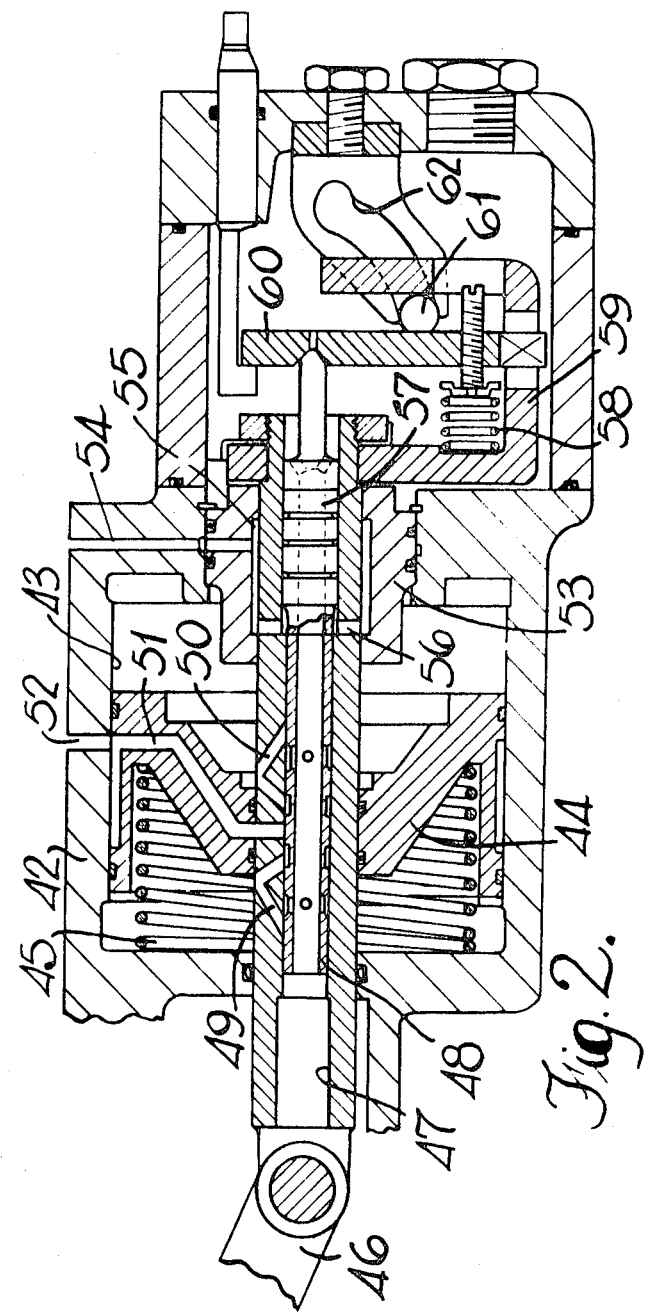
Figure 3:
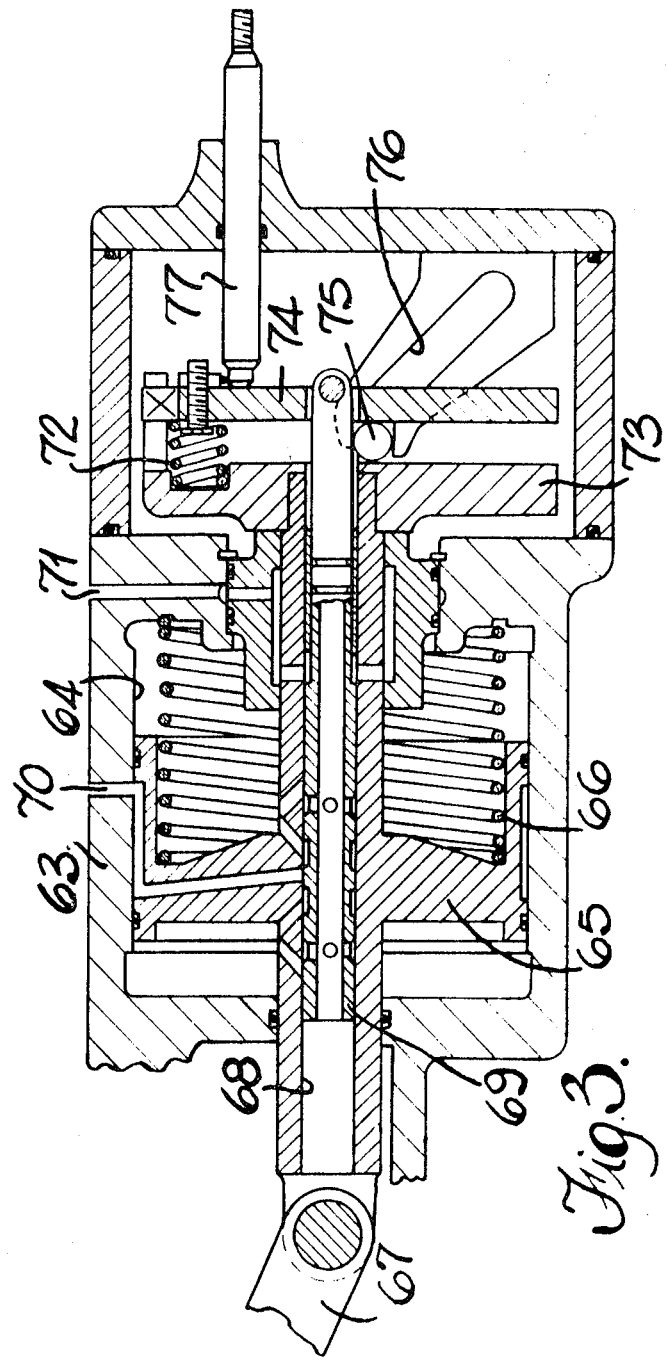

The invention will now be described by way of example with reference to the accompanying drawings in which:

FIG. 1 shows a pump and control system in cross section and constructed in accordance with this invention, FIG. 2 shows an alternative form of control, and FIG. 3 shows a still further alternative form of control.

The control system shown in FIG. 1 is intended for use with an hydraulic positive displacement swash plate type pump which has a rotor 8 with a plurality of angularly spaced bores. The bores contain respective pistons 9 and communicate at one end with ports (not shown) in the body 10, through which liquid can enter and leave the bores as the rotor 8 rotates. The rotor is journaled in the body 10 and the ports communicate with an inlet and an outlet respectively in the body (not shown).

The pistons 9 extend out of the rotor bores and carry slippers 9a which are urged into engagement with an obliquely arranged swashplate 11.

The obliquity of the swashplate can be varied by a control system shown. For this purpose the swashplate 11 is pivotally mounted in a separate body 17 secured to the body 10 and engages a shaft 13 extending across a slot 14 in an end portion of a piston 15.

The piston 15 has a central portion which is of greater diameter than its end portions and engages in a stepped cylinder 16 formed in the body 17 secured to the body 10 of the pump.

The cylinder 16, at the end at which the swashplate is mounted, is subjected to liquid at high pressure from the pump outlet through communicating passages 18, 19 in the bodies 10 and 17 respectively. The interior of the body 10 is normally subjected to relatively low pressure and the region of the cylinder 16 at which the swashplate is mounted is open to the interior of the body 10 so as to be subject also to this low pressure.

The opposite end of the piston 15 from the swashplate 11 is provided with a coaxial bore 20 containing a valve spool 21. The end of this spool extends beyond the end of the piston 15. The spool 21 has two spaced lands separated by a reduced diameter portion and the end nearer to the swashplate 11 is of reduced diameter and slides in a bush 22 in the bore 20. Adjacent to the bush 22 there is an enlarged region in the bore 20 into which a passage 23, extending radially in the piston 15, opens. The other end of this passage 23 communicates with an annular groove 24 in the outside of the piston 15. This, in turn, at all positions of the piston 15, can communicate with a passage 25 in the body 17. This passage 25 communicates with a passage 26 in the body 10 to which liquid at high pressure from the pump outlet is supplied in use.

The cylinder in the body 17 has a fixed end member 27 which is bored to accept the reduced diameter end of the piston 15 in which the bore 20 is formed. Within the body 17 and between this end member 27 and the larger diameter midregion of the piston 15, is defined a chamber 28 which communicates with the bore 20 through radial passages 29 in the piston 15. A further passage 30 in the piston 15 affords communication between the chamber 28 and an annular groove 31 in the exterior of the bush 22 in the bore 20. Radial drillings 32 in this bush 22 enable liquid in the chamber 28 to reach the interior of this bush 22. The end of the bore 20 at which the bush 22 is situated, is open to the interior of the slot 14 in the piston 15. Thus, from the high-pressure inlet passage 26, to the interior of the body 10, there is a flow path for liquid passing through the chamber 28. The flow along this path, however, is dependent upon the position of the spool 21 in the bore 20. In the position of this spool 21 illustrated, no flow can take place since one of the spool lands blocks access between the passage 23 and the region of the bore 20 with which the radial passages 29 communicate, and, moreover, the end of the spool 21 blocks the inner ends of the radial passages 32 in the bush 22.

If, however, the pressure in the pump outlet should rise, the pressure in the passage 26 will also rise. This will result in movement of the spool 21 to the right from the position shown, since the area subject to this pressure tending to move the spool to the right, exceeds that tending to move it in the opposite direction, despite the fact that the difference in these areas is not great as shown in the drawing.

Escape of liquid from the chamber 28 after movement of the spool 21 to the right results in greater pressure being exerted on the piston 15 at the end fed by passage 19 than in the chamber 28, though there is also an area differential between these ends. Hence, the piston 15 will thus move to the right thus reducing the inclination of the swashplate 11 with respect to the axis of rotation of the rotor 8. As illustrated, the swashplate 11 is shown in its position of maximum inclination.

Equilibrium is attained when the force due to pressure on the ends of the piston 15 is equal, this being accompanied by a small leakage flow through the chamber 28 to low pressure. If the pressure in the passage 26 falls due to falling pump outlet pressure, the spool will move to the left thus cutting off the leakage flow referred to and causing a buildup of pressure in the chamber 28 towards the full outlet pressure in the passage 26. Because the area on which this acts exceeds that at the opposite, left, end of the piston 15, the latter will move to the left to increase the swashplate angle. Movement continues until equilibrium conditions are again achieved.

The equilibrium position however, in addition to the balance of the pressures on the piston 15 is influenced by the force exerted by a compression spring 33 acting indirectly between the outwardly extending end of the spool 21 and the piston 15.

This spring 33 acts between a U-shaped part 34, connected by a nut 35 to the end of the piston 15, and a lever 36. The lever 36 has a recess near its end remote from the spring 33 in which the end of the spool 21 engages. Between the lever 36 and the end of the spring 33, however, is an adjusting screw 37 accessible through a clearance hole in one limb of the U-shaped part 34.

Engaged between the lever 36 and the U!shaped part 34 is a system of rollers indicated at 38 serving as a fulcrum for the lever 36. The spring 33, part 34, lever 37 and associated parts, are housed within a casing 39 secured to the end of the body 17. In the opposite walls of this casing 39 are respective arcuate slots 40 engaging the ends of the roller 38 and serving to guide it as the piston 15 and part 34 move. The slots 40 are so shaped that with changing position of the piston 15, the leverage exerted by the spring 33 upon the spool 21 changes. Rising pressure in the high-pressure inlet passage 26, results in reduction of the inclination of the swashplate 11 and this also results in movement of the fulcrum point for the lever 36, represented by the roller 38, towards the end of the lever 36 at which the spool engages. Falling pressure has the opposite affect.

The shape of the slots 40 is so chosen, in this example, that the pump output pressure changes so as to produce constant torque in a transmission system of which the pump forms part. A different profile of slot can cause the pump pressure to be maintained substantially constant.

In order to limit the possible movement of the lever 36 in one direction, the casing 39 carries an adjustable stop 41 in the form of a hook, which is connected to a manual control (not shown) whereby an operator can override the automatic operation described.

In the alternative construction illustrated in FIG. 2, there is a body 42 defining a cylinder 43. In the cylinder 43 is a piston 44 formed in two parts secured together. This is urged in one direction by a spring 45, the affect of which, however, in use, is small in relation to the hydraulic loads acting upon the piston 44. One part of the piston 44 is in the form of a tube which extends out of the body 42. To one end of this is pivotally connected a link 46 connected to the pump swashplate (not shown). The bore 47 of this tubular part of the piston 44 is occupied by a slidable hollow stepped spool 48 with spaced radial drillings and annular galleries. Passages 49, 50 in the tubular part of the piston 44 afford communication between the bore 47 and opposite sides of the piston 44.

A low-pressure supply to the bore 57 takes place through a further passage 51 in the piston 44, which communicates, at all positions of the piston in it is cylinder 43, with an inlet 52 in the body 42.

The opposite end of the piston tubular part, from the link 46, is supported in a bush 53 in the body 42 and a high-pressure entry passage 54 is defined in part in the body 42 and in part in this bush 53. The interior of the bush has an annular gallery 55 which communicates with the passage 54 and with radial drillings 56 in the piston tubular part. The high pressure acts on a portion 57 of the spool 48, which acts as a piston in the bore 47 of the piston 44.

The spool 48 is acted upon by the spring 58, U-shaped part 59 and the lever 60 equivalent to the parts 33, 34 and 36 of the FIG. 1 construction. There is also a roller system 61 and slots 62 similar to those in FIG. 1.

In operation high pressure is applied to the spool 48 through the passage 54. When this can reach the left facing step of the spool 48 through the drillings 56, the spool will tend to move to the right thus opening the left-hand side of the piston to the low-pressure passage 52, through passages 49. The piston 44 will now move to the left to reduce pump stroke.

Equilibrium conditions exist when the pressure in the passage 54 falls again. Similarly if the pressure falls below the required level in the passage 54, the spool will be allowed to move to the left, which it does under the influence of the spring 58, thus causing the piston to move to the right by escape of fluid through the passage 50 until the equilibrium conditions are again reached.

FIG. 3 shows a control having a body 63 having a cylinder 64 in which is mounted a piston 65 against which acts a spring 66. The action of this spring 66 is opposite to that of the FIG. 2 construction. The construction is, however, otherwise similar in that the piston is connected to a link 67 connected to the swashplate (not shown) of the pump and it also has a bore 68 occupied by a hollow spool 69 having radial drillings and annular galleries. High- and low-pressure entry passages 70 and 71 are also provided. The operation is, moreover, similar though of opposite effect to the FIG. 2 construction.

In place of the U-shaped part and lever of the other constructions, however, the spring 72 acts between a plate 73 secured to the end of the piston 65 and a lever 74 pivotally connected to the end of the spool 69. A system of rollers 75 acts between the opposing surfaces of the plate 73 and the lever 74 to vary the spring force applied to the spool. The roller system 75 acts in slots 76 in the body. An adjustable stop 77 controls the movement of the lever 74.

Having thus described my invention, what I claim as new and desire to secure by Letters Patent is:

I claim:

1. A control system for a hydraulic positive displacement-type pump comprising a body in which is disposed a piston and cylinder unit, movement of the piston controlling the displacement of the pump, a spool disposed within the piston, passage means in the piston controlled by the spool, the position of the spool controlling fluid pressures acting on the piston, and a spring acting between the spool and the piston or a part carried thereby and means for varying the force exerted by the spring upon the spool in accordance with the position of the piston in the cylinder, said means comprising an element and a lever, the spring acting against the lever and the element acting as a movable fulcrum for the lever, the element being controlled by shaped slots in the body.

2. A control system as claimed in claim 1 in which said element comprises a system of rollers acting between the lever and the part carried by the piston, the movement of the system of rollers being controlled by the shaped slots in the body, whereby a characteristic change in the spring force is provided.

3. A control system as claimed in claim 1 in which there is a manually adjustable stop arranged to limit the permitted travel of the lever against which the spring acts.